(12) United States Patent
Jia et al.

(10) Patent No.: US 11,796,351 B2
(45) Date of Patent: Oct. 24, 2023

(54) DEMODULATION SYSTEM AND DEMODULATION METHOD OF FIBER-OPTIC SENSOR FOR OBTAINING PHASE CHANGE PARAMETERS

(71) Applicant: North University of China, Taiyuan (CN)

(72) Inventors: Pinggang Jia, Taiyuan (CN); Jijun Xiong, Taiyuan (CN); Qianyu Ren, Taiyuan (CN); Jia Liu, Taiyuan (CN); Guowen An, Taiyuan (CN); Wenyi Liu, Taiyuan (CN)

(73) Assignee: North University of China, Taiyuan (CN)

( * ) Notice: Subject to any disclaimer, the term of this patent is extended or adjusted under 35 U.S.C. 154(b) by 0 days.

(21) Appl. No.: 17/821,673

(22) Filed: Aug. 23, 2022

(65) Prior Publication Data
US 2023/0062957 A1 Mar. 2, 2023

(30) Foreign Application Priority Data

Aug. 24, 2021 (CN) .......................... 202110976571.9
Nov. 5, 2021 (CN) .......................... 202111307197.X (51) Int. Cl.
*G01D 5/353* (2006.01)

(52) U.S. Cl.
CPC ..... *G01D 5/35312* (2013.01); *G01D 5/35306* (2013.01)

(58) Field of Classification Search
CPC . G01D 5/35312; G01D 5/35306; Y02D 30/70
See application file for complete search history.

(56) References Cited

U.S. PATENT DOCUMENTS

2007/0297714 A1* 12/2007 Dua ................. G01M 5/0091
 385/14
2021/0333089 A1* 10/2021 Han .................. G01B 9/02003

OTHER PUBLICATIONS

Schmidt, M., et al., Fiber-optic extrinsic fabry-perot interferometer sensors with three-wavelength digital phase demodulation. Optics Letters, 24(9), 599-601 (1999).

* cited by examiner

*Primary Examiner* — Jonathan M Hansen
(74) *Attorney, Agent, or Firm* — AVEK IP, LLC (57) ABSTRACT

Some embodiments of the disclosure provide a demodulation system for obtaining phase change parameters by a fiber-optic Fabry Perot sensor. In an embodiment, the demodulation system includes a transmitting module, a fiber-optic Fabry Perot sensor, a light splitting module, a filter module, a receiving module, and a processing module. The transmitting module transmits a beam with a predetermined wavelength range. The fiber-optic Fabry Perot sensor receives the beam and forms a reflected light beam. The light splitting module is arranged between the transmitting module and the fiber-optic Fabry Perot sensor. The filter module obtains the first light beam, the second light beam, and the third light beam. The filter module has a broadband filter. The receiving module receives the first light beam, the second light beam, and the third light beam and converts them into the first signal, the second signal, and the third signal.

10 Claims, 7 Drawing Sheets

DEMODULATION SYSTEM AND DEMODULATION METHOD OF FIBER-OPTIC SENSOR FOR OBTAINING PHASE CHANGE PARAMETERS

CROSS REFERENCE TO RELATED APPLICATIONS

This application claims priority to Chinese Patent Application No. 202110976571.9, filed on Aug. 24, 2021, and to Chinese Patent Application No. 202111307197.X, filed on Nov. 5, 2021, the disclosure of which are incorporated by reference herein in their entireties.

FIELD OF THE DISCLOSURE

The disclosure relates generally to the field of demodulation. More specifically, the disclosure relates to demodulation systems and demodulation methods of fiber-optic sensors for obtaining phase change parameters.

BACKGROUND

Fiber-optic Fabry Perot (FP) sensors have the advantages of small size, high temperature resistance, corrosion resistance, anti-electromagnetic interference, high sensitivity and high measurement accuracy. It has broad application prospects in aerospace, large buildings, petroleum and other fields. Especially for many parameters such as temperature, pressure, acceleration, acoustics and ultrasound, the demodulation system is required to have a high demodulation speed.

In addition, due to the requirements of multi parameter measurement, as well as the limitations of processing methods and packaging methods, fiber-optic F-P sensors have multiple reflective surfaces. When the F-P sensor has multiple reflective surfaces, the traditional high-speed demodulation method is not applicable. The demodulation methods that can be applied to multi cavity FP sensors mainly include Fourier transform, cross-correlation, non-scanning cross-correlation and so on. Since the frequency spectrum of multi cavity F-P sensor is composed of signals with different frequencies, Fourier transform is a common demodulation method. Cross correlation method finds the maximum value by cross correlating the sensor spectrum with another ideal spectrum. The non-scanning cross-correlation method uses the principle of low coherent interference. When the optical path difference (OPD) between the F-P sensor and another interferometer is equal, the demodulation is realized by obtaining the position with the maximum intensity.

Due to the limitation of hardware, the above demodulation methods are difficult to meet the demodulation speed requirements for dynamic parameters such as vibration, dynamic pressure, acoustic/ultrasonic signals, etc.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

The first aspect of the disclosure provides a demodulation system of a fiber-optic sensor for obtaining phase change parameters, which is a demodulation system for obtaining phase change parameters through a fiber-optic Fabry Perot sensor, including a transmitting module, a fiber-optic Fabry Perot sensor, a light splitting module, a filter module, a receiving module and a processing module. Said transmitting module transmits a light beam with a predetermined wavelength range, said fiber-optic Fabry Perot sensor receives said light beam and forms a reflected light beam, said light splitting module is arranged between said transmitting module and said fiber-optic Fabry Perot sensor, said light splitting module includes at least three ports including a first port connecting said transmitting module, a second port connecting said fiber-optic Fabry Perot sensor and a third port connecting said filter module, said filter module includes a first filter unit which filters said reflected light beam to obtain a first light beam with a first central wavelength, a second filter unit which filters said reflected light beam to obtain a second light beam with a second central wavelength and a third filter unit which filters said reflected light beam to obtain a third light beam with a third central wavelength, said first filter unit, said second filter unit and said third filter unit are broadband filters, said receiving module receives said first light beam, said second light beam and said third light beam and converts them into a first signal, a second signal and a third signal respectively, and said processing module calculates said phase change parameters of said fiber-optic Fabry Perot sensor based on said first signal, said second signal, said third signal, said first central wavelength, said second central wavelength, said third central wavelength and an initial cavity length of the shortest cavity of said fiber-optic Fabry Perot sensor.

In this case, it is possible to use a plurality of reflective surfaces of the fiber-optic Fabry Perot sensor to reflect and transmit the light beam and form a reflected light beam. The reflected light beam is divided into a first light beam, a second light beam, and a third light beam by the light splitting module, and the first light beam, the second light beam, and the third light beam are respectively received and filtered to obtain a first light beam with a first central wavelength The second light beam with the second central wavelength and the third light beam with the third central wavelength may reduce the influence of fiber jitter on the phase change parameters. In this case, it is possible to use a plurality of reflective surfaces of the fiber-optic Fabry Perot sensor to reflect and transmit the light beam and form a reflected light beam. The reflected light beam is divided into a first light beam, a second light beam, and a third light beam by the light splitting module, and the first light beam, the second light beam, and the third light beam are respectively received and filtered to obtain a first light beam with a first central wavelength The second light beam with the second central wavelength and the third light beam with the third central wavelength may reduce the influence of fiber jitter on the phase change parameters. Meanwhile, since the first filter unit, the second filter unit, and the third filter unit are broadband filters, the interference signal (interference light) of the shortest cavity (i.e., the first cavity) may be filtered out.

In addition, in the demodulation system according to the first aspect of the disclosure, optionally, the fiber-optic Fabry Perot sensor is a fiber-optic Fabry Perot multi cavity sensor, the fiber-optic Fabry Perot multi cavity sensor includes at least a first reflecting surface, a second reflecting surface and a third reflecting surface arranged in sequence, the first reflecting surface and the second reflecting surface cooperate to form a first chamber, and the second reflecting surface and the third reflecting surface cooperate to form a second chamber, The first reflecting surface and the third reflecting surface cooperate to form a third chamber, and the initial chamber length of the first chamber is the shortest among the first chamber, the second chamber and the third chamber. In this case, interference information of the first chamber may be extracted by defining the coherent length.

In addition, in the demodulation system according to the first aspect of the disclosure, optionally, the first central wavelength, the second central wavelength and the third central wavelength are within the predetermined wavelength range, and the 3 dB bandwidth of the first filter unit, the 3 dB bandwidth of the second filter unit and the 3 dB bandwidth of the third filter unit are within the predetermined wavelength range. In this case, a first light beam having a first central wavelength, a second light beam having a second central wavelength, and a third light beam with a third central wavelength may be formed.

In addition, in the demodulation system according to the first aspect of the disclosure, optionally, the coherent length is obtained based on the first central wavelength, the second central wavelength, and the third central wavelength, and the optical path difference introduced by the first chamber is less than the coherent length. The coherent length is less than the first predetermined multiple of the optical path difference introduced by any chamber except the first chamber, and the first predetermined multiple is not less than 3. In this case, because the coherent length must be greater than the cavity length of the chamber, there may be obvious interference. Therefore, the coherent length may be used to eliminate the mutual interference between multiple reflecting surfaces, so that the interference phenomenon only exists in the first chamber of the fiber-optic Fabry Perot sensor, so as to realize the demodulation of the fiber-optic F-P sensor and improve the accuracy of demodulation.

In addition, in the demodulation system according to the first aspect of the disclosure, optionally, the light beam emitted by the transmitting module reaches the fiber-optic Fabry Perot sensor through the first port and the second port, and the reflected light beam of the fiber-optic Fabry Perot sensor reaches the filter module through the second port and the third port. In this case, the light splitting module is a non-reversible device, that is, the beam entering the first port may be emitted from the second port, and the beam entering the second port may be emitted from the third port. Therefore, the beam emitted by the transmitting module may reach the fiber Fabry Perot sensor from the second port after entering the first port, and the reflected light beam may reach the filter module from the third port after entering the second port, Further, the direction of the light beam may be adjusted, and different types of light beams may be guided to different components or equipment through the light splitting module.

The second aspect of the disclosure provides a fiber-optic sensor demodulation method for obtaining phase change parameters, which is characterized in that the demodulation method including: obtaining the initial cavity length of the shortest chamber of the fiber-optic Fabry Perot sensor, receiving the first light beam with the first central wavelength, the second light beam with the second central wavelength and the third light beam with the third central wavelength from the fiber-optic Fabry Perot sensor respectively Calculate the first initial phase, the second initial phase and the third initial phase, and the first initial phase, the second initial phase and the third initial phase satisfy the formulas $$\theta_1 = \frac{4\pi n L_0}{\lambda_1}$$

$$\theta_2 = \frac{4\pi n L_0}{\lambda_2}$$

$$\theta_3 = \frac{4\pi n L_0}{\lambda_3}$$

The target phase satisfies the formula.

$$\Delta\theta' = \arctan\left[\frac{(I_1 - I_2)(\cos\theta_2 - \cos\theta_3) - (I_2 - I_3)(\cos\theta_1 - \cos\theta_2)}{(I_1 - I_2)(\sin\theta_2 - \sin\theta_3) - (I_2 - I_3)(\sin\theta_1 - \sin\theta_2)}\right]$$

In this case, the first light beam, the second light beam, and the third light beam may be filtered to obtain the first light beam with the first central wavelength, the second light beam with the second central wavelength, and the third light beam with the third central wavelength, and the influence of fiber chattering on the phase change parameters may be reduced. At the same time, the target phase may be calculated conveniently by using the formula, and then the target phase may be compensated to obtain the phase change parameters, so as to meet the demodulation speed requirements for dynamic parameters such as vibration, dynamic pressure, acoustic/ultrasonic signals, etc.

In addition, in the demodulation method according to the second aspect of the disclosure, optionally, the first central wavelength, the second central wavelength, and the third central wavelength are different from each other. In this case, the quadrature signal may be obtained by using signals with different central wavelengths, and then the target phase may be calculated.

In addition, in the demodulation method according to the second aspect of the disclosure, optionally, the difference between the target phase and the phase change parameter matching the target phase is a predetermined multiple of the compensation value, the compensation value is $\pi$, and the predetermined multiple is an integer. In this case, since the target phase range obtained by the arctangent algorithm is $-\pi/2$ to $\pi/2$, when the target phase exceeds this range, phase jump will occur. Therefore, more accurate phase change value may be obtained by compensating the target phase.

In addition, in the demodulation method according to the second aspect of the disclosure, optionally, when calculating the phase change parameters, the initial value of the predetermined multiple is unchanged, and the predetermined multiple is accumulated in the following way: in the adjacent target phases, if the difference between the subsequent target phase and the previous target phase is less than the first predetermined value and greater than the second predetermined value, the predetermined multiple is 0. If the difference between the subsequent target phase and the previous target phase is greater than the first predetermined value, the predetermined multiple is reduced by 1. If the difference between the subsequent target phase and the previous target phase is less than the second predetermined value, the predetermined multiple is increased by 1. In this case, the true phase change (i.e. phase change parameter) of the chamber of the fiber-optic Fabry Perot sensor may be obtained.

In addition, in the demodulation method according to the second aspect of the disclosure, optionally, the first predetermined value is greater than 0 and matches the predetermined sampling rate for the first signal matching the first light beam, the second signal matching the second light beam and the third signal matching the third light beam at a predetermined sampling rate, and the first predetermined value and the second predetermined value are opposite to each other. In this case, accurate phase change parameters may be obtained.

In some embodiments, the discourse provides a demodulation system of a fiber-optic sensor for obtaining phase change parameters. The demodulation system includes a transmitting module, a fiber-optic Fabry Perot sensor, a light splitting module, a filter module, a receiving module, and a processing module.

Said transmitting module is configured to transmit a light beam with a predetermined wavelength range, said fiber-optic Fabry Perot sensor is configured to receive said light beam and to form a reflected light beam, said light splitting module is arranged between said transmitting module and said fiber-optic Fabry Perot sensor.

Said light splitting module includes a first port connecting said transmitting module, a second port connecting said fiber-optic Fabry Perot sensor, and a third port connecting said filter module.

Said filter module includes a first filter unit configured to filter said reflected light beam and to produce a first light beam with a first central wavelength, a second filter unit configured to filter said reflected light beam and to produce a second light beam with a second central wavelength, and a third filter unit configured to filter said reflected light beam and to produce a third light beam with a third central wavelength.

Said first filter unit, said second filter unit, and said third filter unit are broadband filters, said receiving module is configured to receive said first light beam, said second light beam, and said third light beam and to convert them into a first signal, a second signal, and a third signal.

Said processing module is configured to calculate said phase change parameters of said fiber-optic Fabry Perot sensor based on said first signal, said second signal, said third signal, said first central wavelength, said second central wavelength, said third central wavelength, and an initial cavity length of a shortest cavity of said fiber-optic Fabry Perot sensor.

Optionally, said fiber-optic Fabry Perot sensor is a fiber-optic Fabry Perot multi cavity sensor, said fiber-optic Fabry Perot multi cavity sensor includes a first reflecting surface, a second reflecting surface, and a third reflecting surface arranged in sequence, said first reflecting surface and said second reflecting surface form a first chamber, said second reflecting surface and said third reflecting surface form a second chamber, said first reflecting surface and said third reflecting surface form a third chamber, and an initial chamber length of said first chamber is the shortest among those of said first chamber, said second chamber, and said third chamber.

Optionally, said first central wavelength, said second central wavelength, and said third central wavelength are within said predetermined wavelength range, and 3 dB bandwidth of said first filter unit, 3 dB bandwidth of said second filter unit, and 3 dB bandwidth of said third filter unit are within said predetermined wavelength range.

Optionally, a coherent length is obtained based on said first central wavelength, said second central wavelength, and said third central wavelength, an optical path difference introduced in said first chamber is less than said coherent length, said coherent length is less than a first predetermined multiple of an optical path difference introduced in either said second chamber or said third chamber, and said first predetermined multiple is not less than 3.

Optionally, the light beam emitted by said transmitting module reaches said fiber-optic Fabry Perot sensor through said first port and said second port, and the reflected light beam from said fiber-optic Fabry Perot sensor reaches said filter module through said second port and said third port.

In other embodiments, the disclosure provides a demodulation method of a fiber-optic sensor for obtaining phase change parameters. The demodulation method includes the following steps.

Obtaining an initial cavity length of a shortest chamber of a fiber-optic Fabry Perot sensor.

Receiving a first light beam with a first central wavelength, a second light beam with a second central wavelength, and a third light beam with a third central wavelength from said fiber-optic Fabry Perot sensor.

Calculating a first initial phase, a second initial phase, and a third initial phase, said first initial phase, said second initial phase, and said third initial phase satisfying following formulas.

$$\theta_1 = \frac{4\pi n L_0}{\lambda_1}$$

$$\theta_2 = \frac{4\pi n L_0}{\lambda_2}$$

$$\theta_3 = \frac{4\pi n L_0}{\lambda_3}$$

Here, $\theta_1$ represents the first initial phase obtained based on the first central wavelength and the cavity length, $\theta_2$ represents the second initial phase, $\theta_3$ represents the third initial phase, n represents a refractive index of a dielectric, $L_0$ represents the initial cavity length, $\lambda_1$ represents said first central wavelength, $\lambda_2$ represents said second central wavelength, and $\lambda_3$ represents said third central wavelength.

Calculating a target phase based on said first light beam, said second light beam, said third light beam, said first initial phase, said second initial phase, and said third initial phase, said target phase satisfying the following formula.

$$\Delta\theta' = \arctan\left[\frac{(I_1 - I_2)(\cos\theta_2 - \cos\theta_3) - (I_2 - I_3)(\cos\theta_1 - \cos\theta_2)}{(I_1 - I_2)(\sin\theta_2 - \sin\theta_3) - (I_2 - I_3)(\sin\theta_1 - \sin\theta_2)}\right]$$

Here, $\Delta\theta'$ Represents said target phase, $I_1$ represents an intensity of said first light beam, $I_2$ represents an intensity of said second light beam, and $I_3$ represents an intensity of said third light beam.

Compensating said target phase to obtain said phase change parameter.

Optionally, said first central wavelength, said second central wavelength, and said third central wavelength are different from each other.

Optionally, said difference between said target phase and said phase change parameter matching said target phase is a predetermined multiple of a compensation value, said compensation value is π, and said predetermined multiple is an integer.

Optionally, an initial value of said predetermined multiple is 0 when calculating said phase change parameters. Said predetermined multiple is accumulated as follows. In adjacent target phases, if the difference between a subsequent target phase and a previous target phase is less than a first predetermined value and greater than a second predetermined value, said predetermined multiple is unchanged, if the difference between the subsequent target phase and the previous target phase is greater than the first predetermined value, said predetermined multiple is reduced by 1, and if the difference between the subsequent target phase and the previous target phase is less than the second predetermined value, said predetermined multiple is increased by 1.

Optionally, said first predetermined value is greater than 0 and matches a predetermined sampling rate, said first predetermined value and said second predetermined value are opposite to each other, and a first signal matches the first light beam, a second signal matches the second light beam, and a third signal matches the third light beam at the predetermined sampling rate.

BRIEF DESCRIPTION OF THE DRAWINGS

Illustrative embodiments of the present disclosure are described in detail below with reference to the figures.

DETAILED DESCRIPTION

The following describes some non-limiting embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

The disclosure discloses a demodulation system of a fiber-optic sensor for obtaining phase change parameters, which is a demodulation system for obtaining phase change parameters through a fiber-optic Fabry Perot sensor, including a transmitting module, a fiber-optic Fabry Perot sensor, a light splitting module, a filter module, a receiving module and a processing module. The transmitting module transmits a light beam with a predetermined wavelength range, the fiber-optic Fabry Perot sensor receives the light beam and forms a reflected light beam, the light splitting module is arranged between the transmitting module and the fiber-optic Fabry Perot sensor, the light splitting module may include at least three ports including a first port connecting the transmitting module, a second port connecting the fiber-optic Fabry Perot sensor and a third port connecting the filter module, the filter module may include a first filter unit which filters the reflected light beam to obtain a first light beam with a first central wavelength, a second filter unit which filters the reflected light beam to obtain a second light beam with a second central wavelength and a third filter unit which filters the reflected light beam to obtain a third light beam with a third central wavelength, the first filter unit, the second filter unit and the third filter unit are broadband filters, the receiving module receives the first light beam, the second light beam and the third light beam and converts them into a first signal, a second signal and a third signal respectively, and the processing module calculates the phase change parameters of the fiber-optic Fabry Perot sensor based on the first signal, the second signal, the third signal, the first central wavelength, the second central wavelength, the third central wavelength and an initial cavity length of the shortest cavity of the fiber-optic Fabry Perot sensor.

In this case, it is possible to use a plurality of reflective surfaces of the fiber-optic Fabry Perot sensor to reflect the light beam transmitted by the transmitting module and form a reflected light beam, use the light splitting module to divide the reflected light beam into a first light beam, a second light beam, and a third light beam, and receive the first light beam, the second light beam, and the third light beam respectively and filter them to obtain a first light beam with a first central wavelength, a second light beam with a second central wavelength and a third light beam with a third central wavelength, which may reduce the influence of fiber jitter on the phase change parameters. Meanwhile, since the first filter unit, the second filter unit, and the third filter unit are broadband filters, the interference signal (interference light) of the shortest cavity (i.e., the first cavity) may be filtered out.

In some examples, the demodulation system may obtain at least one parameter from the interference phenomenon obtained by the fiber-optic Fabry Perot sensor. Specifically, a fiber-optic Fabry Perot sensor may have a plurality of reflecting surfaces that reflect laser beams. Multiple reflective surfaces of the fiber-optic Fabry Perot sensor may form multiple reflected light beams. The demodulation system may receive multiple reflected light beams and calculate parameters according to the interference between multiple reflected light beams. The parameters may refer to the phase change parameters.

The demodulation system according to the disclosure is further described below through the accompanying drawings.

Figure 1:
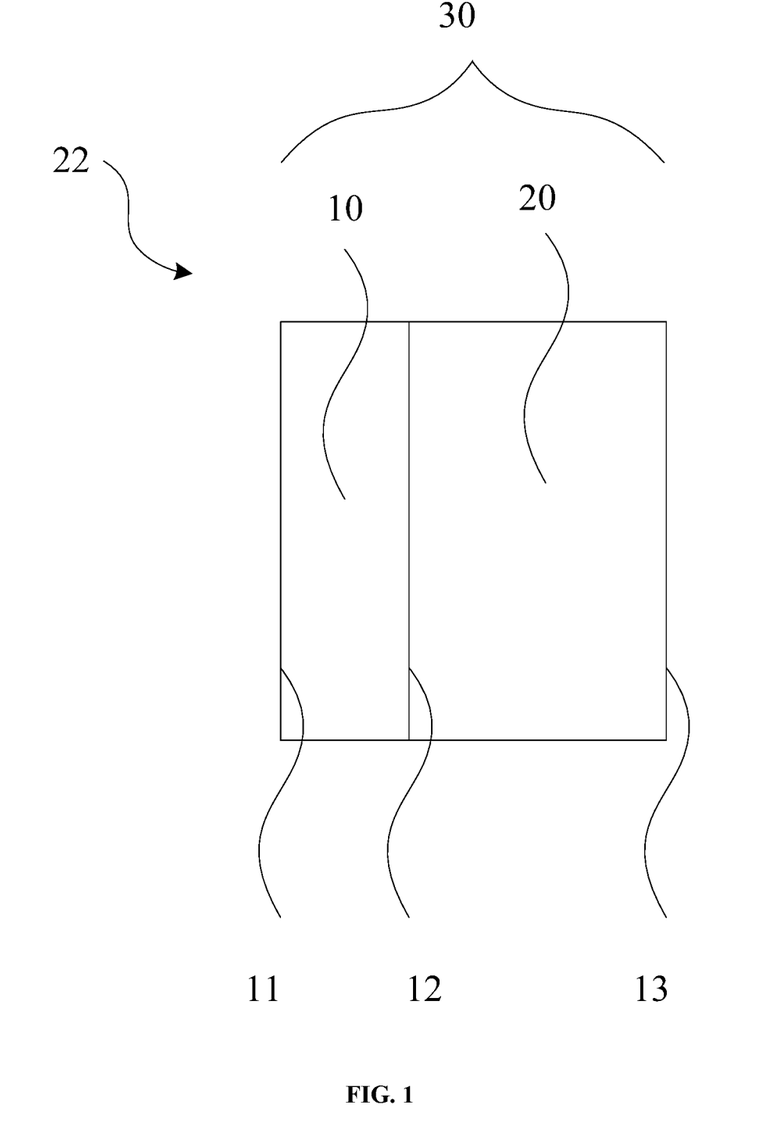
FIG. 1 is a structural diagram showing a fiber-optic Fabry Perot multi cavity sensor according to an embodiment of the disclosure.
Figure 2:
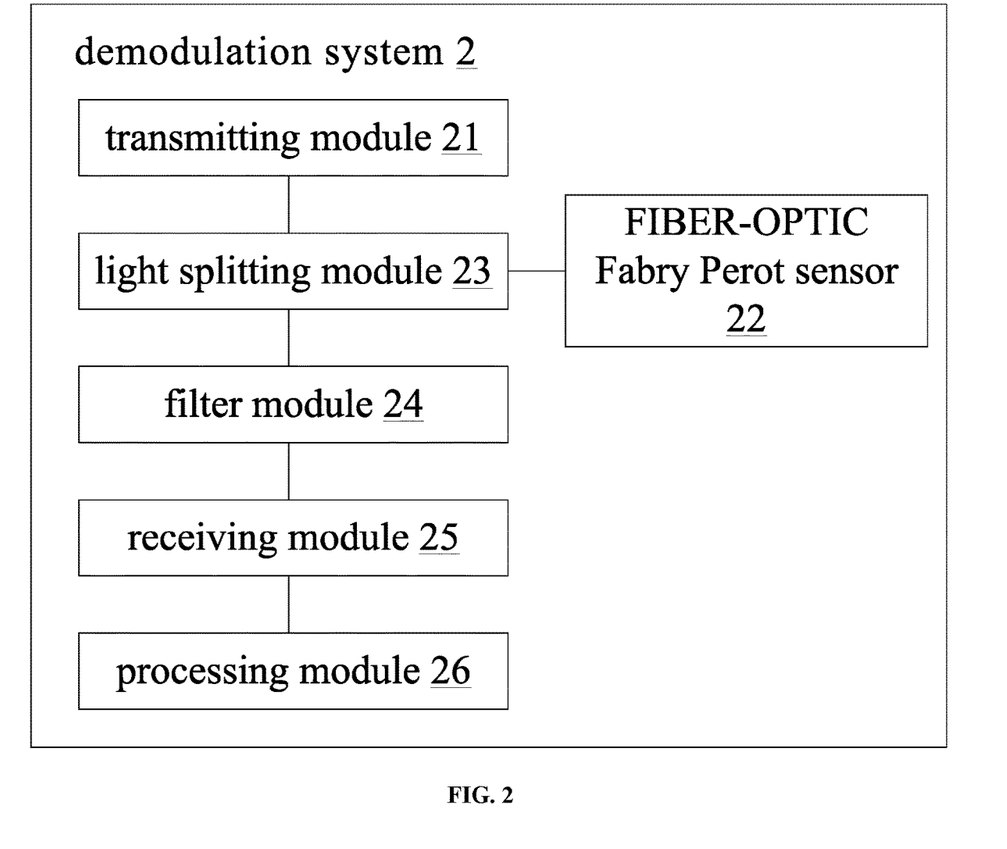
FIG. 2 is a structural diagram showing a demodulation system according to an embodiment of the disclosure.
Figure 3:
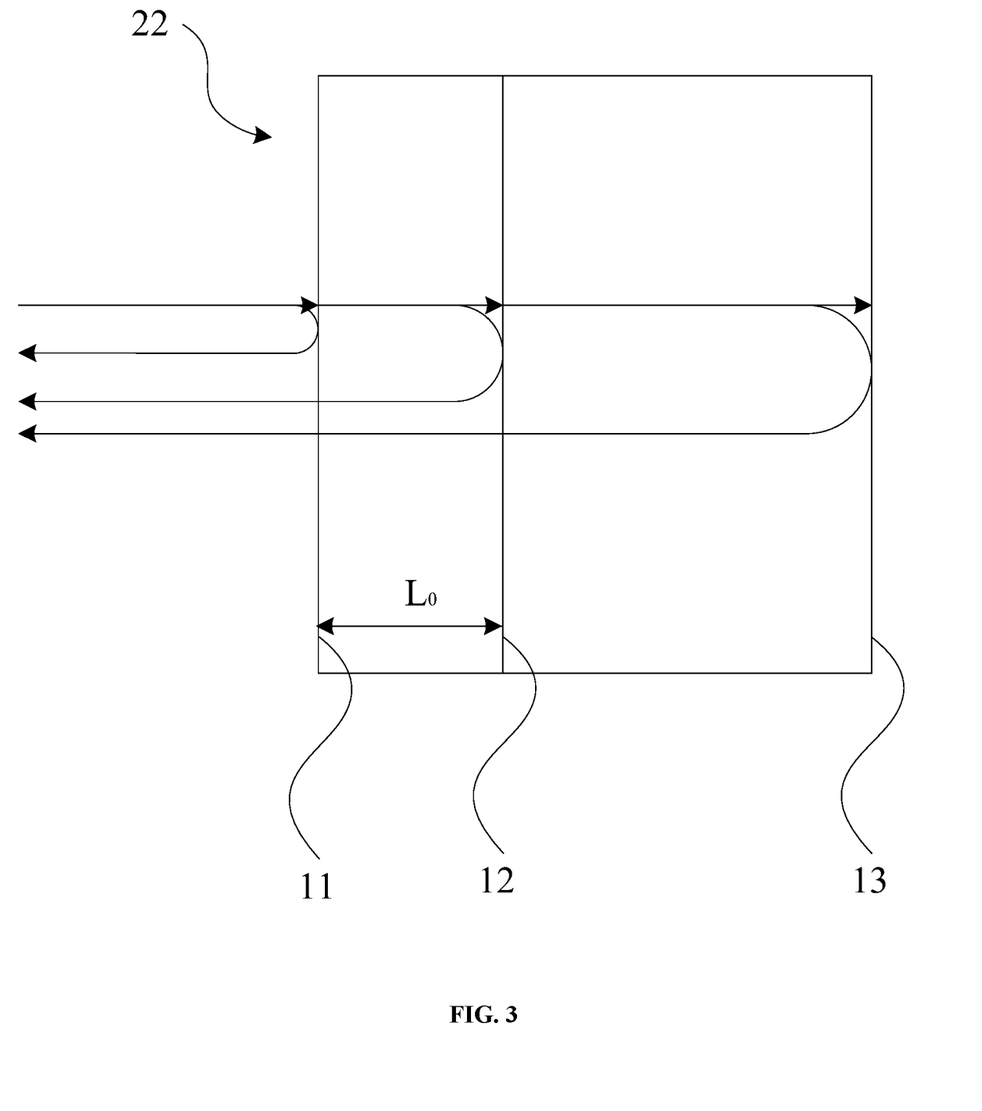
FIG. 3 is a schematic diagram showing the principle of a fiber-optic Fabry Perot multi cavity sensor according to an embodiment of the disclosure.

FIG. 1 is a structural diagram showing a fiber-optic Fabry Perot multi cavity sensor according to an embodiment of the disclosure. FIG. 2 is a structural diagram showing demodulation system 2 according to an embodiment of the disclosure. FIG. 3 is a schematic diagram showing the principle of a fiber-optic Fabry Perot multi cavity sensor according to an embodiment of the disclosure.

In some examples, as shown in FIG. 1, demodulation system 2 may include transmitting module 21.

In some examples, transmitting module 21 may be operable to transmit at least one light beam having a predetermined wavelength range. In some examples, the predetermined wavelength range may be a larger wavelength range, for example, the predetermined wavelength range may be 1260 nm to 1625 nm. In some examples, the predetermined wavelength range may be a narrower wavelength range, for example, the predetermined wavelength range may be 1525 nm to 1610 nm. In some examples, the predetermined wavelength range may be continuous. In some examples, the predetermined wavelength range may be discontinuous.

In some examples, transmitting module 21 may be used to transmit a light beam having a predetermined wavelength range. In this case, the first light beam, the second light beam and the third light beam (to be described later) may have the same optical parameters. In some examples, the optical parameters may include at least one of phase, amplitude (light intensity), and state of polarization.

In some examples, transmitting module 21 may be operable to transmit a plurality of light beams having a predetermined wavelength range. In some examples, three beams having a predetermined wavelength range may have different central wavelengths. Specifically, transmitting module 21 may simultaneously transmit a first light beam having a first central wavelength, a second light beam having a second central wavelength, and a third light beam having a third central wavelength. In this case, a light beam with different central wavelengths may be emitted to fiber Fabry Perot sensor 22, so that reflected light beams with different central wavelengths may be formed.

In some examples, the multiple beams emitted by transmitting module 21 may have the same optical parameters, for example, the beams emitted by transmitting module 21 may have the same phase, the beams emitted by transmitting module 21 may have the same amplitude (light intensity), and the beams emitted by transmitting module 21 may have the same state of polarization.

In some examples, as shown in FIG. 2, demodulation system 2 may also include light splitting module 23. In some examples, the beam splitter module 23 may be a fiber-optic circulator. Specifically, demodulation system 2 may also include a fiber-optic circulator arranged between transmitting module 21 and fiber-optic Fabry Perot sensor 22. In this case, the fiber-optic circulator may be used to adjust the direction of the light beam.

Figure 4:
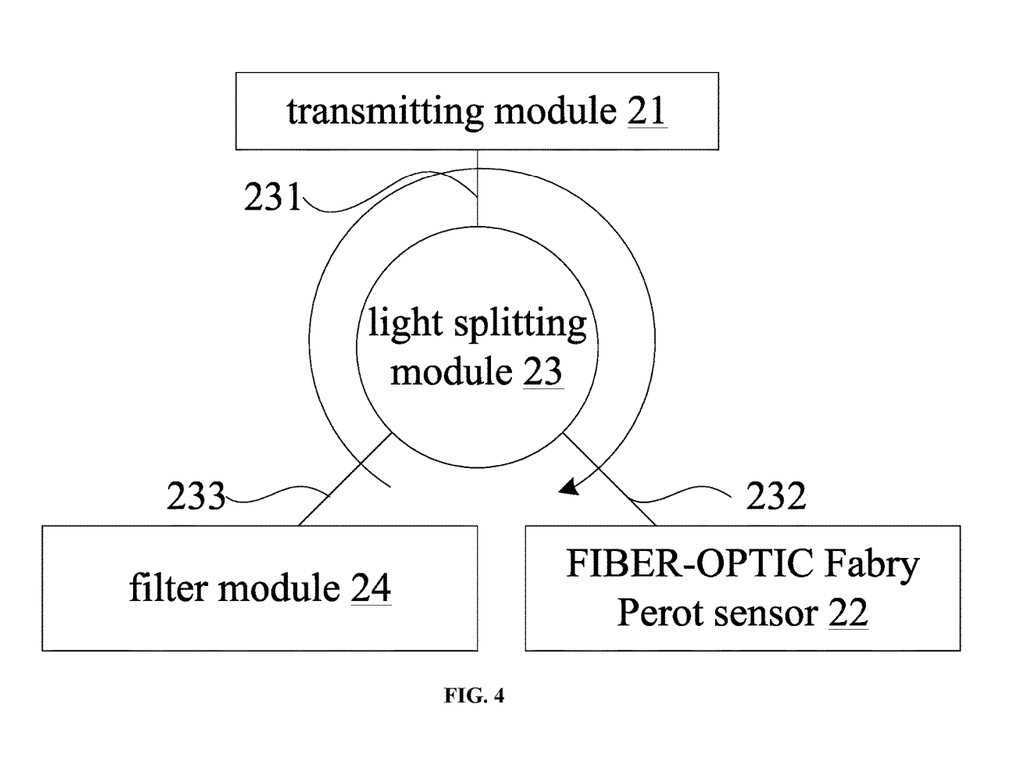
FIG. 4 is a schematic diagram showing a light splitting module according to an embodiment of the disclosure.

FIG. 4 is a schematic diagram showing light splitting module 23 according to an embodiment of the disclosure.

In some examples, as shown in FIG. 4, light splitting module 23 may have at least three ports, which may include a first port connecting transmitting module 21, a second port connecting fiber-optic Fabry Perot sensor 22, and a third port connecting filter module 24. In this case, since light splitting module 23 is a non-reversible device, that is, the beam entering the first port may be emitted from the second port, and the beam entering the second port may be emitted from the third port. Therefore, the beam emitted by transmitting module 21 may reach fiber Fabry Perot sensor 22 from the second port after entering the first port, and the reflected light beam may reach filter module 24 from the third port after entering the second port. Further, the beam direction may be adjusted, and different types of beams may be guided to different components or devices through light splitting module 23.

In some examples, the first port of light splitting module 23 may be connected to transmitting module 21 through a fiber-optic, the second port of light splitting module 23 may be connected to fiber-optic Fabry Perot sensor 22 through a fiber-optic, and the third port of light splitting module 23 may be connected to filter module 24 through a fiber-optic. In this case, since the fiber-optic has certain flexibility, the relative positions of light splitting module 23, transmitting module 21, fiber-optic Fabry Perot sensor 22 and filter module 24 may be adjusted by using the fiber-optic.

In some examples, as shown in FIG. 2, demodulation system 2 may include fiber-optic Fabry Perot sensor 22. In some examples, as shown in FIG. 3, fiber-optic Fabry Perot sensor 22 may receive a light beam and form a reflected light beam. In some examples, fiber-optic Fabry Perot sensor 22 may have at least two reflective surfaces. Specifically, fiber-optic Fabry Perot sensor 22 may have first reflecting surface 11, second reflecting surface 12, and first chamber 10 between first reflecting surface 11 and second reflecting surface 12. First reflecting surface 11 may be parallel to second reflecting surface 12. First reflecting surface 11 may be the reflecting surface to which the light beam first reaches. A first reflected light beam and a first transmitted light beam may be formed after the beam reaches first reflecting surface 11, and a second reflected light beam may be formed after the first transmitted light beam reaches second reflecting surface 12. The first reflected light beam may interfere with the second reflected light beam, and the interference phenomenon may be related to the cavity length of first chamber 10. In this case, since the cavity length of first chamber 10 will be changed when the parameters change, the parameters near fiber-optic Fabry Perot sensor 22 may be obtained through the interference phenomenon.

In some examples, a fiber-optic Fabry Perot multi cavity sensor may include at least three reflecting surfaces and at least three chambers. Specifically, the fiber-optic Fabry Perot multi cavity sensor may include at least three reflecting surfaces, and any two reflecting surfaces may form a Fabry Perot (FP) interference cavity.

In some examples, as shown in FIG. 3, a fiber-optic Fabry Perot multicavity sensor may include at least first reflecting surface 11, a second reflecting surface, and third reflecting surface 13 arranged in sequence, and first reflecting surface 11, the second reflecting surface and third reflecting surface 13 may be parallel to each other. In some examples, first reflecting surface 11 and the second reflecting surface may cooperate to form first chamber 10, second reflecting surface 12 and the third reflecting surface may cooperate to form second chamber 20, and first reflecting surface 11 and the third reflecting surface may cooperate to form third chamber 30. In this case, the interference information of the first chamber may be extracted by defining the coherent length.

In some examples, in first chamber 10, second chamber 20 and third chamber 30, first chamber 10 may also be referred to as a sensitive chamber or a sensitive unit. In some examples, first chamber 10 has the shortest cavity length.

In some examples, the chambers of fiber-optic Fabry Perot sensor 22 (which may include first chamber 10, second chamber 20, and third chamber 30) may introduce different optical path differences.

In some examples, the optical path difference introduced by first chamber 10 may be less than the coherent length which may be obtained based on the first central wavelength, the second central wavelength, and the third central wavelength. In this case, the coherent length represents the distance that coherent waves (e.g. electromagnetic waves) maintain a certain degree of coherence for propagation. Therefore, the larger the coherent length, the better the coherence, and the interference phenomenon may be more obvious.

In some examples, the coherent length satisfies the following formulas.

$$l_1 = \frac{\lambda_1^2}{\Delta\lambda_1}$$

$$l_2 = \frac{\lambda_1^2}{\Delta\lambda_1}$$

$$l_3 = \frac{\lambda_3^2}{\Delta\lambda_3}$$

Here, $l_1$ represents the coherent length of a first light beam having a first central wavelength, $\lambda_1$ represents the first central wavelength, $\Delta\lambda_1$ represents the 3 dB bandwidth of the first light beam (3 dB bandwidth of the first filter unit), $l_2$ represents the coherent length of a second light beam with a second central wavelength, $\lambda_2$ represents the second central wavelength, $\Delta\lambda_2$ represents the 3 dB bandwidth of the second light beam (the 3 dB bandwidth of the second filter unit), $l_3$ represents the coherent length of a third light beam with a third central wavelength, $\lambda_3$ represents the third central wavelength (3 dB bandwidth of the third filter unit), $\Delta\lambda_3$ represents 3 dB bandwidth of the third light beam.

Figure 5:
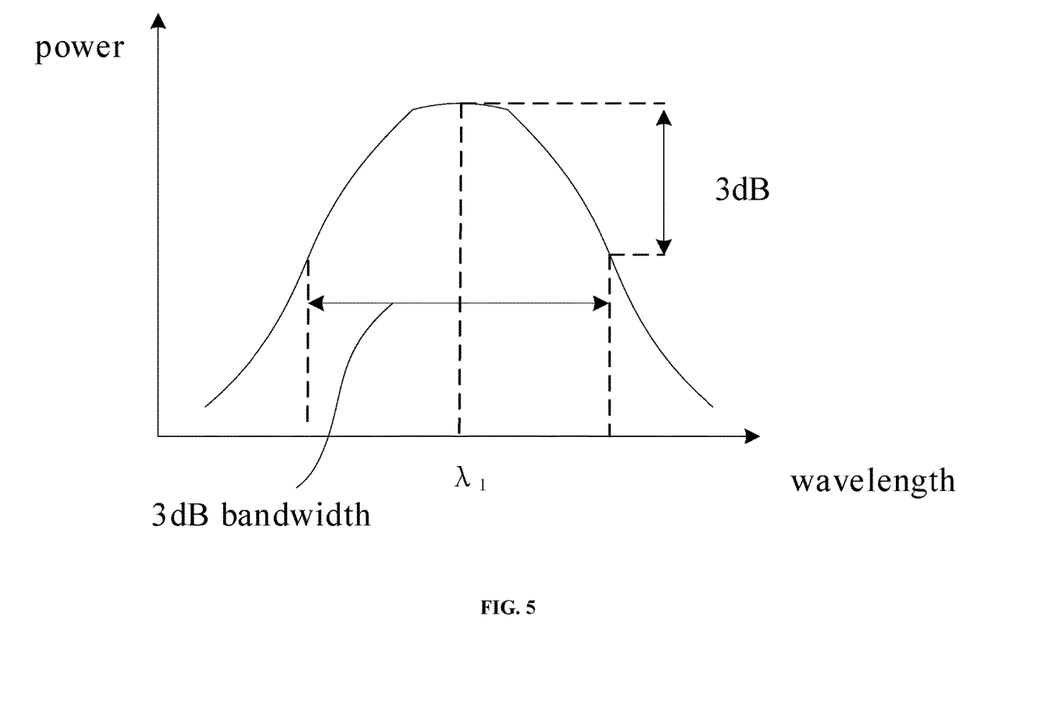
FIG. 5 is a schematic diagram showing a 3 dB bandwidth according to an embodiment of the disclosure.

FIG. 5 is a schematic diagram showing a 3 dB bandwidth according to an embodiment of the disclosure.

In some examples, as shown in FIG. 5, the 3 dB bandwidth of the first filter unit may be the wavelength range defined when the highest point of the power spectral density of the first filter unit drops to ½.

In some examples, the coherent length may be greater than the cavity length of first chamber 10. In some examples, the coherent length may be less than a first predetermined multiple of the optical path difference introduced by any one of the chambers. In some examples, the coherent length may be less than a first predetermined multiple of the optical path difference introduced by any chamber other than first chamber 10, and in some examples, the first predetermined multiple may be greater than 3. In this case, since the coherent length must be greater than the cavity length of the chamber in order to have obvious interference, the coherent length may be used to eliminate the mutual interference between multiple reflecting surfaces, so that the interference phenomenon only exists in first chamber 10 of fiber-optic Fabry Perot sensor 22, thereby the demodulation of the fiber-optic F-P sensor is realized.

In some examples, as shown in FIG. 2, demodulation system 2 may include filter module 24.

In some examples, filter module 24 may receive the reflected light beam and divide the reflected light beam into a first light beam, a second light beam and a third light beam.

In some examples, filter module 24 may have a fiber-optic coupler. In this case, the fiber-optic coupler may divide the light beam received by filter module 24 into a plurality of light beams and release a plurality of light beams from the port.

In some examples, the fiber coupler may be a 1×3 fiber-optic coupler. The 1×3 fiber-optic coupler may divide the light beam received by filter module 24 into three light beams (including the first light beam, the second light beam and the third light beam), and release the first light beam, the second light beam and the third light beam respectively through each end in the three head port.

In some examples, the ports of the fiber-optic coupler may be connected to a plurality of filter units respectively. In some examples, a plurality of filter units may be respectively connected to receiving module 25.

In some examples, the plurality of filter units may include a first filter unit, a second filter unit and a third filter unit. In this case, if the transmitting unit emits a plurality of beams with different central wavelengths, filter module 24 may divide the beams into a first light beam with a first central wavelength, a second light beam with a second central wavelength, and a third light beam with a third central wavelength based on different central wavelengths. If the transmitting unit emits a beam with a wide predetermined wavelength range, filter module 24 may use the filter unit to divide the beam into a first light beam, a second light beam and a third light beam, and filter the first light beam, the second light beam and the third light beam to obtain a first light beam with a first central wavelength, a second light beam with a second central wavelength and a third light beam with a third central wavelength.

In some examples, the first filter unit may filter a light beam (E. G., the first light beam) passing through the first filter unit at a first central wavelength. In this case, the light whose wavelength is close to the first central wavelength may pass through the first filter unit, and the light whose wavelength is far away from the first central wavelength may be prevented from passing through the first filter unit, thereby a first light beam with a first central wavelength is formed. The second filter unit may filter a light beam (E. G., the second light beam) passing through the second filter unit at a second central wavelength. In this case, the light whose wavelength is close to the second central wavelength may pass through the second filter unit, and the light whose wavelength is far away from the second central wavelength may be prevented from passing through the second filter unit, thereby a second light beam with a second central wavelength may be formed. The third filter unit may filter a light beam (E. G., the third light beam) passing through the third filter unit at a third central wavelength. In this case, the light whose wavelength is close to the third central wavelength may pass through the third filter unit, and the light whose wavelength is far away from the third central wavelength may be prevented from passing through the third filter unit, thereby a third light beam with a third central wavelength is formed.

In some examples, the first central wavelength, the second central wavelength and the third central wavelength may be different from each other. In some examples, the first central wavelength may be 1260 nm to 1625 nm, the second central wavelength may be 1260 nm to 1625 nm, and the third central wavelength may be 1260 nm to 1625 nm. In this case, the signals with different central wavelengths may be used to obtain quadrature signals, and the target phase may be calculated.

In some examples, the first filter unit, the second filter unit and the third filter unit are broadband filters, which may be filters with a 3 dB bandwidth length of 10 nm to 30 nm. In this case, since the broadband filter may filter out the interference signal of the shortest cavity (first chamber 10), the phase change parameters of first chamber 10 may be calculated.

In some examples, the first central wavelength, the second central wavelength and the third central wavelength are within the predetermined wavelength range, and the 3 dB bandwidth of the first filter unit, the 3 dB bandwidth of the second filter unit and the 3 dB bandwidth of the third filter unit are within the predetermined wavelength range of transmitting module 21. In this case, a first light beam having a first central wavelength, a second light beam having a second central wavelength and a third light beam with a third central wavelength may be formed.

In some examples, as shown in FIG. 2, demodulation system 2 may include receiving module 25. In this case, receiving module 25 may receive the first light beam, the second light beam and the third light beam and convert them into the first signal, the second signal and the third signal respectively.

In some examples, receiving module 25 may include a sensing unit and a sampling circuit. In some examples, the sensing unit may be connected to filter module 24. Specifically, the sensing unit may be a three channel photodetector, with which the first filter unit, the second filter unit and the third filter unit may be respectively connected through fiber-optics, and the sampling circuit may be a three channel sampling circuit. The three channels of the sampling circuit may be paired and connected with the three channels of the sensing unit one by one. In this case, the sensing unit may receive the first light beam, the second light beam and the third light beam, convert the first light beam, the second light beam and the third light beam into a first analog signal, a second analog signal and a third analog signal respectively, and convert the first analog signal, the second analog signal and the third analog signal into a first digital signal, a second digital signal and a third digital signal through the sampling circuit. Further, the first digital signal, the second digital signal and the third digital signal may be used for calculation to obtain phase change parameters.

In some examples, receiving module 25 may not include a sampling circuit. In this case, the first light beam, the second light beam and the third light beam may be received by the sensing unit, and the first light beam, the second light beam and the third light beam may be converted into a first analog signal, a second analog signal and a third analog signal respectively, and the first analog signal, the second analog signal and the third analog signal may be used for calculation to obtain phase change parameters In some examples, the sampling circuit may sample the first analog signal, the second analog signal and the third analog signal at a predetermined sampling rate. In some examples, the sampling rate may refer to the sampling frequency.

In some examples, as shown in FIG. 2, demodulation system 2 may include a processing module 26, which may calculate the phase change parameters of fiber-optic Fabry Perot sensor 22 based on the first signal, the second signal, the third signal, the first central wavelength, the second central wavelength, the third central wavelength and the initial cavity length of the shortest cavity of fiber-optic Fabry Perot sensor 22.

The second aspect of the disclosure provides a demodulation method for measuring parameters based on fiber-optic Fabry Perot sensor 22 with high reliability and robustness. In some examples, demodulation system 2 for measuring parameters based on fiber-optic Fabry Perot sensor 22 may also be referred to as a demodulation method based on fiber-optic Fabry Perot sensor 22 or a demodulation system of a fiber-optic sensor 2 for obtaining phase change parameters, and demodulation system 2 for measuring parameters based on fiber-optic Fabry Perot sensor 22 may also be referred to as a demodulation method for short.

In some examples, the demodulation method according to the disclosure may be applied to various demodulation systems 2. Optionally, the demodulation method according to the disclosure may be applied to the above demodulation system 2.

Figure 6:
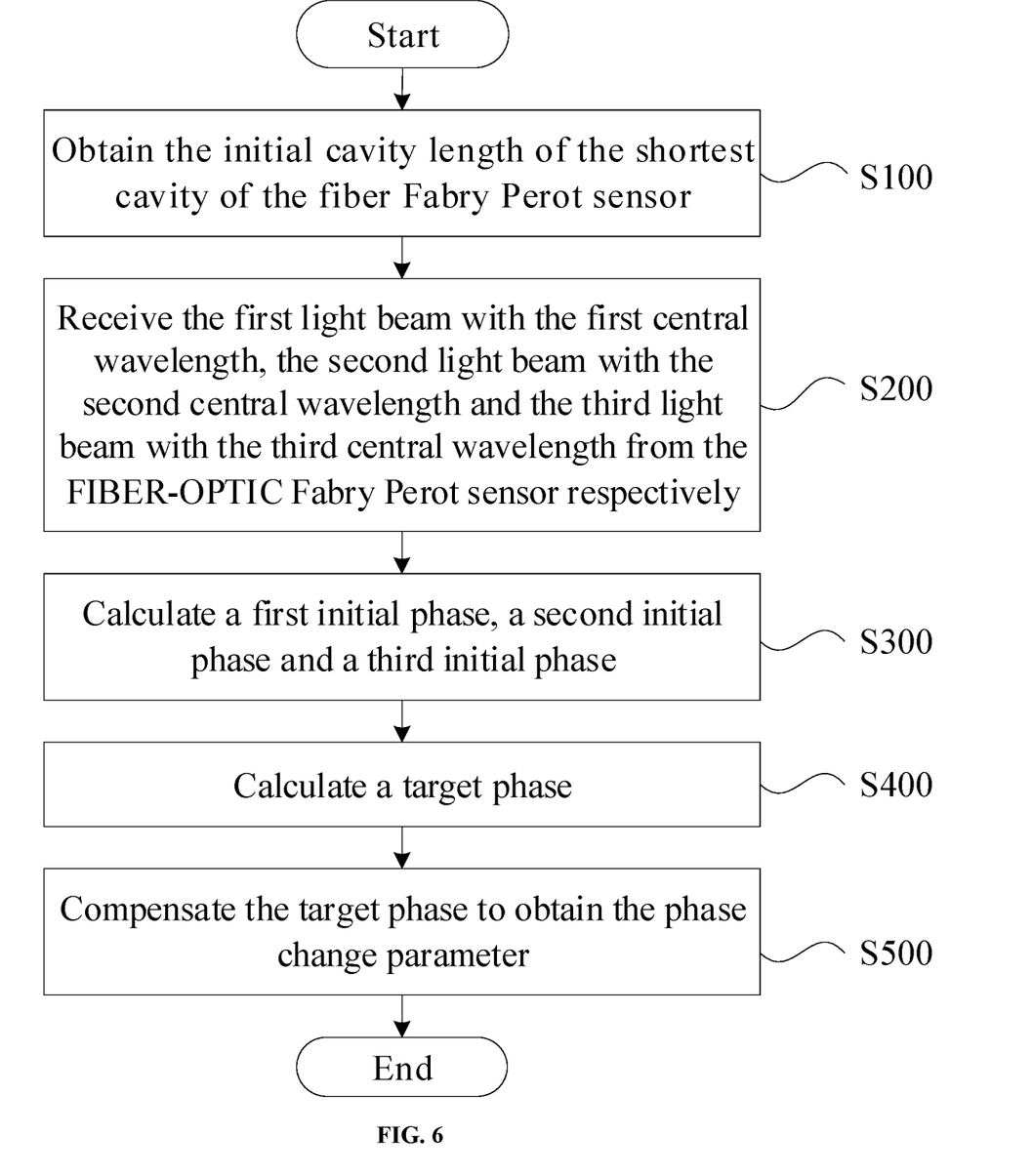
FIG. 6 is a flowchart showing a demodulation method according to an embodiment of the disclosure.

FIG. 6 is a flowchart showing a demodulation method according to an embodiment of the disclosure.

In some examples, as shown in FIG. 6, the demodulation method may include: acquiring the initial cavity length of the shortest cavity of fiber-optic Fabry Perot sensor 22 (step S100); receiving a first light beam with a first central wavelength, a second light beam with a second central wavelength and a third light beam with a third central wavelength from fiber-optic Fabry Perot sensor 22, respectively (step S200); calculating the first initial phase, the second initial phase and the third initial phase (step S300); calculating the target phase (step S400); compensating the target phase to obtain the phase change parameter (step S500).

In this case, the first light beam, the second light beam and the third light beam may be filtered to obtain a first light beam with a first central wavelength, a second light beam with a second central wavelength and a third light beam with a third central wavelength, and the influence of fiber chattering on the phase change parameters may be reduced. At the same time, the target phase may be calculated conveniently by using the formula, and the target phase may be compensated to obtain the phase change parameters. Thereby the demodulation speed requirements for dynamic parameters such as vibration, dynamic pressure, acoustic/ultrasonic signals, etc. may be met.

In some examples, in step S100, the cavity length of the chamber with the shortest cavity length (first chamber 10) of fiber-optic Fabry Perot sensor 22 may be measured. In some examples, the cavity length of first chamber 10 may be measured using a sensor cavity length measuring device.

In some examples, in step S200, the reflected light beam formed by fiber-optic Fabry Perot sensor 22 may be used. In some examples, beams of a first light beam having a first central wavelength, a second light beam having a second central wavelength, and a third light beam having a third central wavelength may be obtained by light splitting module 23 and filter module 24.

In some examples, in step S300, the first initial phase, the second initial phase and the third initial phase are calculated. The first initial phase, the second initial phase and the third initial phase may satisfy the following formulas.

$$\theta_1 = \frac{4\pi n L_0}{\lambda_1}$$

$$\theta_2 = \frac{4\pi n L_0}{\lambda_2}$$

$$\theta_3 = \frac{4\pi n L_0}{\lambda_3}$$

Here, $\theta_1$ represents the first initial phase obtained based on the first central wavelength and the cavity length, $\theta_2$ represents the second initial phase obtained based on the second central wavelength and the cavity length, $\theta_3$ represents the third initial phase obtained based on the third central wavelength and cavity length, n represents the dielectric refractive index, $L_0$ represents the cavity length of the cavity with the shortest cavity length of fiber Fabry Perot sensor 22, $\lambda_1$ represents the first central wavelength, $\lambda_2$ represents the second central wavelength, $\lambda_3$ represents the third central wavelength.

In some examples, step S400 may be calculating the target phase. In some examples, step S400 may be completed jointly by receiving module 25 and processing module 26. Specifically, receiving module 25 may receive the first light beam with the first central wavelength and convert it into a first signal with the first central wavelength, and receiving module 25 may receive the second light beam with the second central wavelength and convert it into a second signal with the second central wavelength, Receiving module 25 may receive a third light beam having a third central wavelength and convert it into a third signal having a third central wavelength. Processing module 26 may calculate the target phase based on the first light beam, the second light beam, the third light beam, the first initial phase, the second initial phase and the third initial phase.

In some examples, the first light beam, the second light beam and the third light beam may be expressed by the following formulas.

$$I_1 = A + B \cos\theta_1$$

$$I_2 = A + B \cos\theta_2$$

$$I_3 = A + B \cos\theta_3$$

Here, $I_1$ represents the light intensity of the first light beam, $I_2$ represents the light intensity of the second light beam, $I_3$ represents the light intensity of the third light beam, A represents the DC component of the interference signal, B represents the amplitude of the interference signal, $\theta_1$ represents the initial phase of the first light beam in first chamber 10 of fiber-optic Fabry Perot sensor 22, $\theta_2$ represents the initial phase of the second light beam in first chamber 10 of fiber-optic Fabry Perot sensor 22, and $\theta_3$ represents the initial phase of the third light beam in first chamber 10 of fiber Fabry Perot sensor 22.

In some examples, after the cavity length of first chamber 10 of fiber Fabry Perot sensor 22 changes, the first light beam, the second light beam and the third light beam may be expressed by the following formulas.

$$I_1 = A + B \cos(\theta_1 + \Delta\theta)$$

$$I_2 = A + B \cos(\theta_2 + \Delta\theta)$$

$$I_3 = A + B \cos(\theta_3 + \Delta\theta)$$

Here, $\Delta\theta$ represents a phase change (i.e., a target phase) caused by a change in the cavity length of first chamber 10 of fiber-optic Fabry Perot sensor 22.

In some examples, processing module 26 may correct three optical signals to two phase quadrature signals. Two channel phase orthogonal signals may be obtained by the following formulas.

$$F_1 = $$
$$B\sin(\Delta\theta) = \frac{(I_1 - I_2)(\cos\theta_2 - \cos\theta_3) - (I_2 - I_3)(\cos\theta_1 - \cos\theta_2)}{(\cos\theta_1 - \cos\theta_2)(\sin\theta_2 - \sin\theta_3) - (\cos\theta_2 - \cos\theta_3)(\sin\theta_1 - \sin\theta_2)}$$

$$F_2 = $$
$$B\cos(\Delta\theta) = \frac{(I_1 - I_2)(\sin\theta_2 - \sin\theta_3) - (I_2 - I_3)(\sin\theta_1 - \sin\theta_2)}{(\cos\theta_1 - \cos\theta_2)(\sin\theta_2 - \sin\theta_3) - (\cos\theta_2 - \cos\theta_3)(\sin\theta_1 - \sin\theta_2)}$$

Here, F1 and F2 indicate mutually orthogonal signals.

The calculation formulas for the initial phase $\theta_1$ of the first light beam in first chamber 10 of fiber-optic Fabry Perot sensor 22, the initial phase $\theta_2$ of the second light beam in first chamber 10 of fiber-optic Fabry Perot sensor 22 and the initial phase $\theta_3$ of the third light beam in first chamber 10 of fiber-optic Fabry Perot sensor 22 may be as follows.

$$\theta_1 = \frac{4\pi n L_0}{\lambda_1}$$

$$\theta_2 = \frac{4\pi n L_0}{\lambda_2}$$

$$\theta_2 = \frac{4\pi n L_0}{\lambda_2}$$

Here, n represents the refractive index of the medium, $L_0$ represents the initial cavity length of first chamber 10, $\lambda_1$ represents the first central wavelength, $\lambda_2$ represents the second central wavelength, and $\lambda_3$ represents the third central wavelength.

In some examples, the target phase of the sensor may be obtained through the arctangent algorithm, and the calculation formula of the target phase is as follows.

$$\Delta\theta = \arctan\left(\frac{F_1}{F_2}\right)$$

In some examples, the target phase may satisfy the following formula.

$$\Delta\theta = \arctan\left[\frac{(I_1 - I_2)(\cos\theta_2 - \cos\theta_3) - (I_2 - I_3)(\cos\theta_1 - \cos\theta_2)}{(I_1 - I_2)(\sin\theta_2 - \sin\theta_3) - (I_2 - I_3)(\sin\theta_1 - \sin\theta_2)}\right],$$

Figure 7:
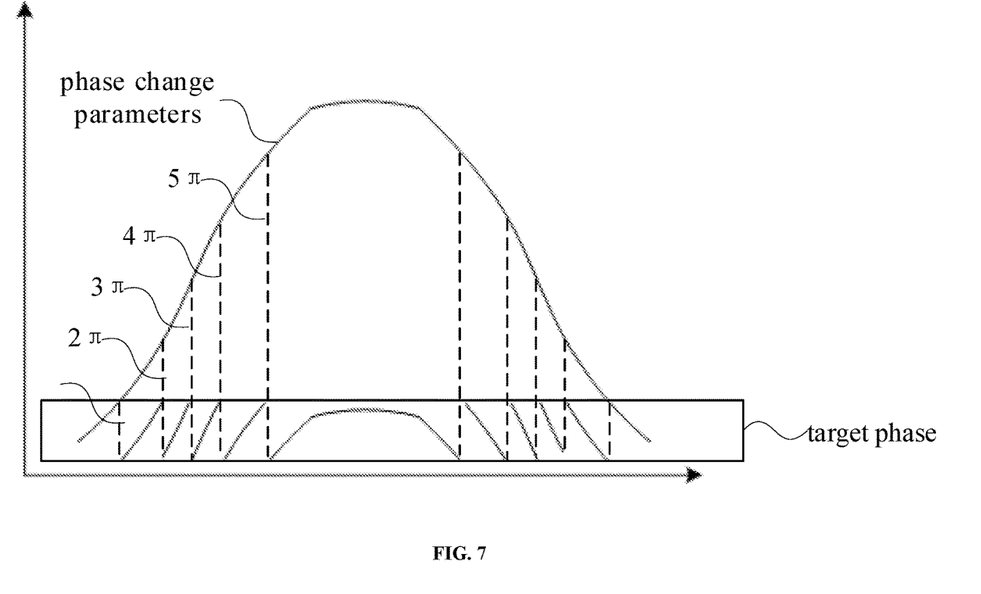
FIG. 7 is a schematic diagram showing the target phase compensation according to an embodiment of the disclosure.

FIG. 7 is a schematic diagram showing the target phase compensation according to an embodiment of the disclosure.

In some examples, in step S500, processing module 26 may compensate the target phase to obtain a phase change parameter.

In some examples, as shown in FIG. 7, the difference between the target phase and the phase change parameter matching the target phase is a predetermined multiple of the compensation value. In some examples, the compensation value is $\pi$, and the predetermined multiple is an integer. In this case, since the target phase range obtained by the arctangent algorithm is $-\pi/2$ to $\pi/2$, when the target phase exceeds this range, phase jump will occur. Therefore, more accurate phase change value may be obtained by compensating the target phase.

In some examples, the target phase may be compensated to obtain a phase change parameter by the following method. The calculation formula of phase change parameters may be as follows.

$$\Delta\theta' = \Delta\theta \pm k\pi$$

Here, K is the predetermined multiple, Δθ represents the true phase change (i.e., the phase change parameter) of the chamber of fiber-optic Fabry Perot sensor 22.

In some examples, the initial value of the predetermined multiple may be set to 0. The predetermined multiples are accumulated in the following way: after the above steps, multiple target phases may be obtained; in adjacent target phases, if the difference between the subsequent target phase and the previous target phase is less than the first predetermined value or greater than the second predetermined value, the predetermined multiples remain unchanged; if the difference between the subsequent target phase and the previous target phase is greater than the first predetermined value, the predetermined multiples are reduced by 1; if the difference between the subsequent target phase and the previous target phase is less than the second predetermined value, the predetermined multiple is increased by 1. In other words, among adjacent target phases, if the difference between the subsequent target phase and the previous target phase is less than the first predetermined value or greater than the second predetermined value, the predetermined multiple k is constant; if the difference between the subsequent target phase and the previous target phase is greater than the first predetermined value, the predetermined multiple k may be replaced by k−1; if the difference between the subsequent target phase and the previous target phase is less than the second predetermined value, the predetermined multiple k may be replaced by k+1. In this case, the true phase change (i.e., the phase change parameter) of the chamber of fiber-optic Fabry Perot sensor 22 may be obtained.

In some examples, among the adjacent phase change parameters obtained by compensation, the difference between the subsequent phase change parameter and the previous phase change parameter is less than the first predetermined value and greater than the second predetermined value.

In some examples, the first predetermined value may be greater than 0 and less than $\pi/2$. In some examples, the second predetermined value may be less than 0 and greater than $-\pi/2$. In some examples, the first predetermined value and the second predetermined value may be opposite numbers to each other. In this case, accurate phase change parameters may be obtained.

In some examples, the first predetermined value may match the predetermined sampling rate. Specifically, the larger the predetermined sampling rate is, the larger the first predetermined value may be In this case, the size of the first predetermined value may be controlled by adjusting the predetermined sampling rate.

Various embodiments of the disclosure may have one of more the following effects. In some embodiments, the disclosure may provide a demodulation system and a demodulation method for measuring parameters based on a fiber-optic Fabry Perot sensor with high reliability and robustness. In other embodiments, the disclosure may provide a demodulation system and a demodulation method for measuring parameters based on a fiber-optic Fabry Perot sensor with high reliability and robustness may be provided.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A demodulation system of a fiber-optic sensor for obtaining phase change parameters, comprising a transmitting module, a fiber-optic Fabry Perot sensor, a light splitting module, a filter module, a receiving module, and a processing module, wherein:
    said transmitting module is configured to transmit a light beam with a predetermined wavelength range;
    said fiber-optic Fabry Perot sensor is configured to receive said light beam and to form a reflected light beam;
    said light splitting module is arranged between said transmitting module and said fiber-optic Fabry Perot sensor;
    said light splitting module comprises:
        a first port connecting said transmitting module,
        a second port connecting said fiber-optic Fabry Perot sensor, and
        a third port connecting said filter module;
    said filter module comprises:
        a first filter unit configured to filter said reflected light beam and to produce a first light beam with a first central wavelength,
        a second filter unit configured to filter said reflected light beam and to produce a second light beam with a second central wavelength, and
        a third filter unit configured to filter said reflected light beam and to produce a third light beam with a third central wavelength;
    said first filter unit, said second filter unit, and said third filter unit are broadband filters;
    said receiving module is configured to receive said first light beam, said second light beam, and said third light beam and to convert them into a first signal, a second signal, and a third signal; and
    said processing module is configured to calculate said phase change parameters of said fiber-optic Fabry Perot sensor based on said first signal, said second signal, said third signal, said first central wavelength, said second central wavelength, said third central wavelength, and an initial cavity length of a shortest cavity of said fiber-optic Fabry Perot sensor.

2. The demodulation system according to claim 1, wherein:
    said fiber-optic Fabry Perot sensor is a fiber-optic Fabry Perot multi cavity sensor;
    said fiber-optic Fabry Perot multi cavity sensor comprises a first reflecting surface, a second reflecting surface, and a third reflecting surface arranged in sequence;
    said first reflecting surface and said second reflecting surface form a first chamber;
    said second reflecting surface and said third reflecting surface form a second chamber;
    said first reflecting surface and said third reflecting surface form a third chamber; and
    an initial chamber length of said first chamber is the shortest among those of said first chamber, said second chamber, and said third chamber.

3. The demodulation system according to claim 1, wherein:
said first central wavelength, said second central wavelength, and said third central wavelength are within said predetermined wavelength range; and
3 dB bandwidth of said first filter unit, 3 dB bandwidth of said second filter unit, and 3 dB bandwidth of said third filter unit are within said predetermined wavelength range.

4. The demodulation system according to claim 2, wherein:
a coherent length is obtained based on said first central wavelength, said second central wavelength, and said third central wavelength;
an optical path difference introduced in said first chamber is less than said coherent length;
said coherent length is less than a first predetermined multiple of an optical path difference introduced in either said second chamber or said third chamber; and
said first predetermined multiple is not less than 3.

5. The demodulation system according to claim 1, wherein:
the light beam emitted by said transmitting module reaches said fiber-optic Fabry Perot sensor through said first port and said second port; and
the reflected light beam from said fiber-optic Fabry Perot sensor reaches said filter module through said second port and said third port.

6. A demodulation method of a fiber-optic sensor for obtaining phase change parameters, comprising the steps of:
obtaining an initial cavity length of a shortest chamber of a fiber-optic Fabry Perot sensor;
receiving a first light beam with a first central wavelength, a second light beam with a second central wavelength, and a third light beam with a third central wavelength from said fiber-optic Fabry Perot sensor;
calculating a first initial phase, a second initial phase, and a third initial phase, said first initial phase, said second initial phase, and said third initial phase satisfying following formulas:

$$\theta_1 = \frac{4\pi n L_0}{\lambda_1},$$

$$\theta_2 = \frac{4\pi n L_0}{\lambda_2}, \text{ and}$$

$$\theta_3 = \frac{4\pi n L_0}{\lambda_3},$$

wherein:
$\theta_1$ represents the first initial phase obtained based on the first central wavelength and the cavity length,
$\theta_2$ represents the second initial phase,
$\theta_3$ represents the third initial phase,
n represents a refractive index of a dielectric,
$L_0$ represents the initial cavity length,
$\lambda_1$ represents said first central wavelength,
$\lambda_2$ represents said second central wavelength, and
$\lambda_3$ represents said third central wavelength;
calculating a target phase based on said first light beam, said second light beam, said third light beam, said first initial phase, said second initial phase, and said third initial phase, said target phase satisfying the following formula:

$$\Delta\theta' = \left[ \frac{(I_1 - I_2)(\cos\theta_2 - \cos\theta_3) - (I_2 - I_3)(\cos\theta_1 - \cos\theta_2)}{(I_1 - I_2)(\sin\theta_2 - \sin\theta_3) - (I_2 - I_3)(\sin\theta_1 - \sin\theta_2)} \right],$$

wherein:
$\Delta\theta'$ Represents said target phase,
$I_1$ represents an intensity of said first light beam,
$I_2$ represents an intensity of said second light beam, and
$I_3$ represents an intensity of said third light beam; and
compensating said target phase to obtain said phase change parameter.

7. The demodulation method according to claim 6, wherein said first central wavelength, said second central wavelength, and said third central wavelength are different from each other.

8. The demodulation method according to claim 6, wherein:
said difference between said target phase and said phase change parameter matching said target phase is a predetermined multiple of a compensation value;
said compensation value is $\pi$; and
said predetermined multiple is an integer.

9. The demodulation method according to claim 8, wherein:
an initial value of said predetermined multiple is 0 when calculating said phase change parameters; and
said predetermined multiple is accumulated as follows:
in adjacent target phases, if the difference between a subsequent target phase and a previous target phase is less than a first predetermined value and greater than a second predetermined value, said predetermined multiple is unchanged, if the difference between the subsequent target phase and the previous target phase is greater than the first predetermined value, said predetermined multiple is reduced by 1, and if the difference between the subsequent target phase and the previous target phase is less than the second predetermined value, said predetermined multiple is increased by 1.

10. The demodulation method according to claim 9, wherein:
said first predetermined value is greater than 0 and matches a predetermined sampling rate;
said first predetermined value and said second predetermined value are opposite to each other; and
a first signal matches the first light beam, a second signal matches the second light beam, and a third signal matches the third light beam at the predetermined sampling rate.

* * * * *